US012703368B2

(12) United States Patent
Park et al.

(10) Patent No.: US 12,703,368 B2
(45) Date of Patent: Aug. 11, 2026

(54) DEVICE AND METHOD FOR CONTROLLING USER INTERFACE

(71) Applicants: Hyundai Motor Company, Seoul (KR); Kia Corporation, Seoul (KR)

(72) Inventors: Dang Hee Park, Seoul (KR); Yong Gwon Jeon, Suwon-Si (KR); Kwon Su Shin, Incheon (KR); Kang In Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 479 days.

(21) Appl. No.: 18/173,427

(22) Filed: Feb. 23, 2023

(65) Prior Publication Data

US 2024/0092370 A1 Mar. 21, 2024

(30) Foreign Application Priority Data

Sep. 20, 2022 (KR) ........................ 10-2022-0118831

(51) Int. Cl.
*B60W 40/09* (2012.01)
*B60W 50/14* (2020.01)
*G06V 20/59* (2022.01)

(52) U.S. Cl.
CPC ............ *B60W 40/09* (2013.01); *B60W 50/14* (2013.01); *G06V 20/597* (2022.01); *B60W 2050/146* (2013.01); *B60W 2540/21* (2020.02)

(58) Field of Classification Search
CPC ...... G06V 20/59; G06V 40/20; G06V 40/103; G06V 20/597; G06F 3/0416; G06F 3/167;
(Continued)

(56) References Cited

U.S. PATENT DOCUMENTS

2014/0309806 A1* 10/2014 Ricci ........................ G06F 21/31 701/1
2016/0063314 A1* 3/2016 Samet ..................... G06F 21/31 348/78

(Continued)

FOREIGN PATENT DOCUMENTS

KR 102287683 B1 8/2021
KR 20210037925 A * 8/2021

(Continued)

OTHER PUBLICATIONS

Machine Translation KR20210037925A (Year: 2021).*
Machine Translation KR20220038959A (Year: 2022).*

*Primary Examiner* — Anne Marie Antonucci
(74) *Attorney, Agent, or Firm* — Banner & Witcoff, Ltd.

(57) ABSTRACT

A device for controlling a user interface may include a sensor configured to acquire information associated with a passenger of a vehicle, a user interface device configured to receive at least one user input of the passenger, and a processor. The processor may monitor, based on the information associated with the passenger, the passenger, determine, based on an abnormality associated with an appearance of the passenger, a passenger type for the passenger, and provide, based on the passenger type for passenger and via the user interface device, a user interface associated with the passenger type, wherein the user interface associated with the passenger type is configured to reduce a task completion time for the passenger type.

20 Claims, 18 Drawing Sheets

(58) Field of Classification Search
CPC ........... G06F 3/011; G06F 3/005; G06N 3/02; B60W 40/09; B60W 50/14; B60W 2050/146; B60W 2540/21; B60W 2540/223; B60W 2540/227
USPC ......................................... 701/36, 45, 24, 27
See application file for complete search history.

(56) References Cited

U.S. PATENT DOCUMENTS

| | | | | |
|---|---|---|---|---|
| 2016/0104486 | A1* | 4/2016 | Penilla | G10L 25/45<br>704/232 |
| 2020/0394428 | A1* | 12/2020 | Turcot | G06V 20/59 |
| 2021/0188205 | A1* | 6/2021 | Adusumalli | G06V 10/25 |
| 2022/0203996 | A1* | 6/2022 | Katz | B60W 50/14 |

FOREIGN PATENT DOCUMENTS

| | | | |
|---|---|---|---|
| KR | 102412643 | B1 | 6/2022 |
| KR | 20220038959 | A * | 6/2022 |

* cited by examiner

DEVICE AND METHOD FOR CONTROLLING USER INTERFACE

CROSS-REFERENCE TO RELATED APPLICATION

This application claims the benefit of priority to Korean Patent Application No. 10-2022-0118831, filed in the Korean Intellectual Property Office on Sep. 20, 2022, the entire contents of which are incorporated herein by reference.

TECHNICAL FIELD

The present disclosure relates to a device and a method for controlling a user interface.

BACKGROUND

A vehicle may be equipped with a user interface (UI) for communication between the vehicle and a user.

A user interface device may include a physical user interface (PUI) device and a graphical user interface (GUI) device. The physical user interface device (PUI) may be a device that receives user commands in a physical manner, such as a keypad, a remote controller, and a touchpad, and the graphical user interface device (GUI) may be a device that receives the user commands as an icon or a menu displayed on a display is selected.

A user may move a cursor by referring to the menu, a list, the icon, and the like displayed via the graphical user interface device, and select an item on which the cursor is positioned. The user may move the cursor via the physical user interface device to select the item.

Additional functions of the vehicle in addition to a basic travel function of the vehicle may be added, and the user interface for controlling the same may also be diversified and complicated.

There are several types of passengers boarding the vehicle, but the user interface may be uniform for all of the passengers, so that some passengers may find the user interface inconvenient.

In particular, if an autonomous driving function of the vehicle is adopted, the number of passengers other than a driver simply for driving may increase, and accordingly, a use of various user interfaces other than the driving operations of a driver may increase, but the user interfaces may not be optimized for different types of the passengers.

SUMMARY

The following summary presents a simplified summary of certain features. The summary is not an extensive overview and is not intended to identify key or critical elements.

An aspect of the present disclosure provides a device and a method for controlling a user interface that may provide the user interface optimized corresponding to each of various passengers (e.g., effectively controlling various user interfaces based on passenger types).

Another aspect of the present disclosure provides a device and a method for controlling a user interface that may reduce a task completion time for passengers to control the user interface.

The technical problems to be solved by the present disclosure are not limited to the aforementioned problems, and any other technical problems not mentioned herein will be clearly understood from the following description by those skilled in the art to which the present disclosure pertains.

A device may comprise: a sensor configured to acquire information associated with a passenger of a vehicle; a user interface device configured to receive at least one user input of the passenger; and a processor. The processor may be configured to: monitor, based on the information associated with the passenger, the passenger; determine, based on an abnormality associated with an appearance of the passenger, a passenger type for the passenger; and provide, based on the passenger type for passenger and via the user interface device, a user interface associated with the passenger type, wherein the user interface associated with the passenger type is configured to reduce a task completion time for the passenger type.

The sensor may comprise a camera configured to capture an image of the passenger. The processor may be further configured to: perform an artificial intelligence learning process associated with at least one of: a preset body part; or a specific object connected to the preset body part; and determine at least one of: an estimated age of the passenger; or a degree of freedom of a body part of the passenger.

The processor may be further configured to activate, based on the degree of freedom of the body part of the passenger being equal to or lower than a critical degree of freedom, at least one of: a motion recognition device associated with the user interface device; or a voice recognition device associated with the user interface device.

The processor may be further configured to activate, based on the estimated age of the passenger being equal to or higher than a first critical age or being equal to or lower than a second critical age, a voice recognition device associated with the user interface device.

The processor may be further configured to: determine, based on the artificial intelligence learning process, the abnormality associated with the appearance of the passenger; and activate, based on a determination that the passenger has a visual impairment or an arm impairment, a voice recognition device associated with the user interface device.

The processor may be further configured to activate, based on a determination that the passenger has a hearing impairment, at least one of: a touch screen associated with the user interface device; or a motion recognition device associated with the user interface device.

The processor may be further configured to identify personal information of the passenger to determine an abnormality associated with at least one body part of the passenger.

The processor may be further configured to: determine a behavior pattern of the passenger, and display a display image on a display device at a position facing a face of the passenger.

The processor may be further configured to activate, based on a determination that the passenger is eating or drinking, a speaker to receive a voice input from the passenger.

The processor may be further configured to: activate a display associated with a sitting position of the passenger; and activate, based on the sitting position of the passenger corresponding to a rear seat of the vehicle, at least one of: a voice recognition device; or a motion recognition device.

A method may comprise: detecting, by a device, a passenger of a vehicle; determining, based on an abnormality associated with an appearance of the passenger, a passenger type for the passenger; and providing, based on the passenger type for the passenger and via a user interface device, a user interface associated with the passenger type, wherein the user interface associated with the passenger type is configured to reduce a task completion time for the passenger type.

The detecting the passenger may comprise: receiving an image of the passenger captured by a camera.

The determining the passenger type for the passenger may comprise: performing an artificial intelligence learning process associated with at least one of: a preset body part; or a specific object connected to the preset body part; and determining at least one of: an estimated age of the passenger; or a degree of freedom of a body part of the passenger.

The method may further comprise: activating, based on the degree of freedom of the body part of the passenger being equal to or lower than a critical degree of freedom, at least one of: a motion recognition device associated with the user interface device; or a voice recognition device associated with the user interface device.

The method may further comprise: activating, based on the estimated age of the passenger being equal to or higher than a first critical age or being equal to or lower than a second critical age, a voice recognition device associated with the user interface device.

The method may further comprise: determining, based on the artificial intelligence learning process, the abnormality associated with the appearance of the passenger; and activating, based on a determination that the passenger has a visual impairment or an arm impairment, a voice recognition device associated with the user interface device The method may further comprise: activating, based on a determination that the passenger has a hearing impairment, at least one of: a touch screen associated with the user interface device; or a motion recognition device associated with the user interface device.

The determining the abnormality associated with the appearance of the passenger may be further based on personal information of the passenger. The abnormality associated with the appearance of the passenger may comprise an abnormality associated with at least one body part of the passenger.

The method may further comprise: displaying a display image on a display device at a position facing a face of the passenger. The determining the passenger type for the passenger further comprises: determining a behavior pattern of the passenger.

The method may further comprise: activating, based on a determination that the passenger is eating or drinking, a speaker to receive a voice input from the passenger.

The method may further comprise: determining a sitting position of the passenger; activating a display associated with the sitting position of the passenger; and activating, based on the sitting position of the passenger corresponding to a rear seat of the vehicle, at least one of: a voice recognition device; or a motion recognition device.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
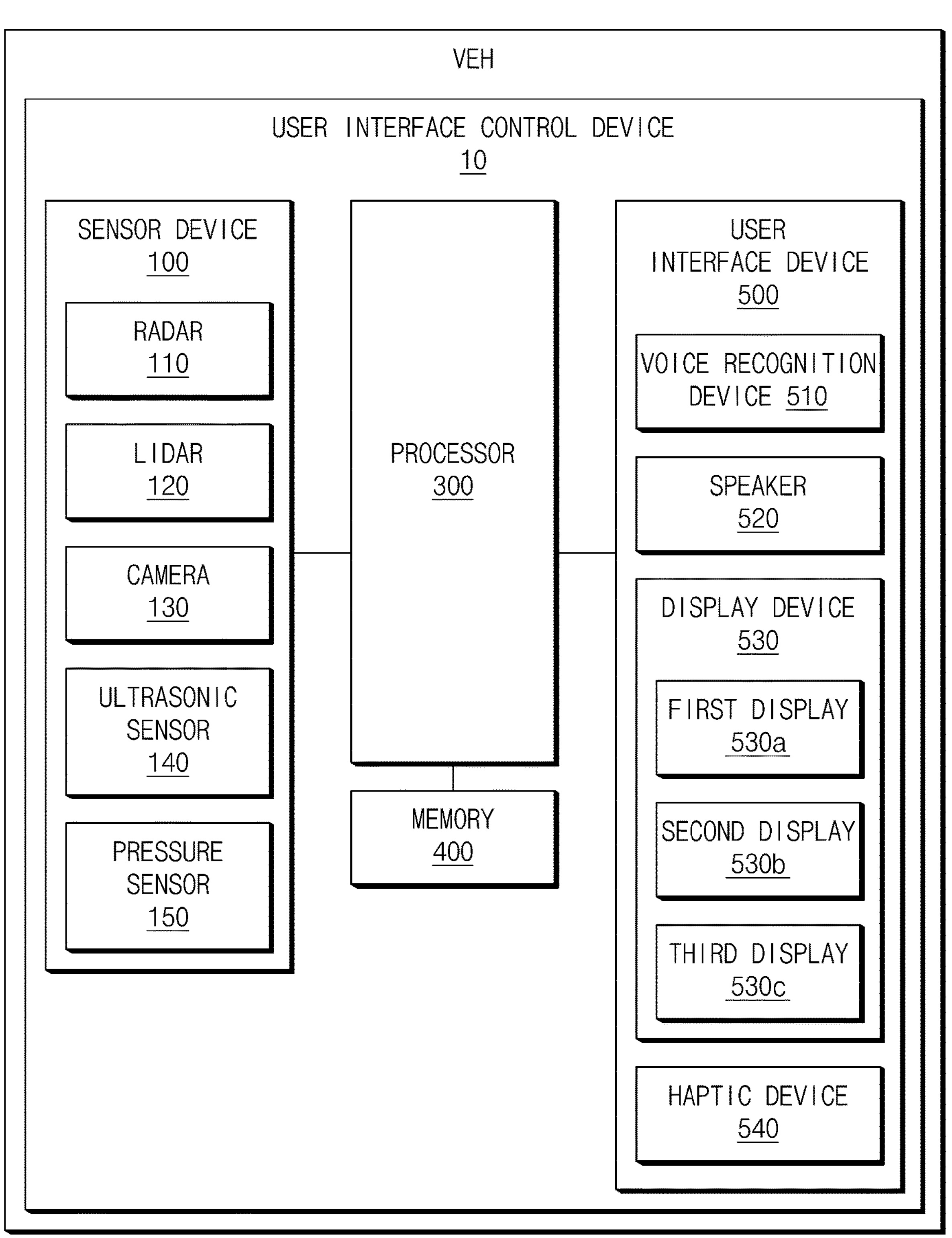
FIG. 1 is a diagram showing a configuration of a user interface control device.

Hereinafter, various examples of the present disclosure will be described in detail with reference to the exemplary drawings. In adding the reference numerals to the components of each drawing, it should be noted that the identical or equivalent component is designated by the identical numeral even when they are displayed on other drawings. Further, in describing the examples of the present disclosure, a detailed description of the related known configuration or function will be omitted when it is determined that it interferes with the understanding of the embodiment of the present disclosure.

In describing the components of the examples according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, examples of the present disclosure will be described in detail with reference to FIGS. 1 to 18.

FIG. 1 is a diagram showing a configuration of a user interface control device. FIG. 1 shows an example user interface control device that is applied to a vehicle. Hereinafter, the present disclosure will be mainly described with the user interface applied to the vehicle, but the user interface control device may be applied to various types of mobility devices (e.g., vehicles, planes, robots, drones, etc.) for passengers to board. For example, the user interface control device may be applied to a manned aircraft.

Referring to FIG. 1, a user interface control device 10 may include a sensor device 100, a processor 300, a memory 400, and a user interface device 500.

The sensor device 100, which may be for monitoring the inside of the vehicle, may include a radar 110, a lidar 120, a camera 130, an ultrasonic sensor 140, a pressure sensor 150, and the like.

The radar 110 may transmit a directional transmission signal and receive a reflected wave of the transmission signal as a reception signal. The radar 110 may determine an object based on a frequency difference between the transmission signal and the reception signal.

The lidar 120 may determine the object by transmitting a laser pulse and measuring a time at which the transmitted laser pulse is reflected. The lidar 120 may provide 3D information.

The camera 130 may acquire image data of the inside of the vehicle based on an electrical signal acquired via an image sensor. The camera 130 may be disposed to acquire images for a plurality of seat regions, and, for example, the plurality of cameras 130 may be installed to correspond to the respective seat regions.

The camera 130 may be at least one of a mono camera, a stereo camera, and an around view monitoring (AVM) camera.

The ultrasonic sensor 140 may transmit an ultrasonic wave generated via an ultrasonic actuator and calculate a distance from the object based on receiving the ultrasonic wave reflected by the object. The ultrasonic sensor 140 may be disposed to sense objects for the plurality of seat regions, and, for example, the plurality of ultrasonic sensors 140 may be installed to correspond to the respective seat regions.

The pressure sensor 150 may be a pressure sensor that is built into a seat and senses a pressure applied to the seat. The pressure acquired by the pressure sensor 150 may be used in a process of determining whether the passenger is sitting.

The processor 300 may monitor the passenger based on information of the passenger. The information of the passenger may be the image acquired by the camera 130. The processor 300 may determine a type of passenger based on an appearance of the passenger or whether there is an abnormality in a passenger's body on the basis of a monitoring result. The processor 300 may select a user interface to be activated of the user interface device 500 differently so as to shorten a task completion time based on the type of passenger. An example of the user interface will be described later.

The processor 300 may perform a learning process associated with the image based on an artificial intelligence to determine the type of passenger. To this end, the processor 300 may include an artificial intelligence (AI) processor. The AI processor may learn a neural network using a pre-stored program. The neural network for the image learning may be designed to simulate a human brain structure on a computer, and may include a plurality of network nodes having weights that simulate neurons of a human neural network. The plurality of network nodes may transmit and receive data with each other based on connection relationships thereof so as to simulate a synaptic activity of the neurons in which the neurons transmit and receive a signal via a synapse. The neural network may include a deep learning model developed from a neural network model. In the deep learning model, the plurality of network nodes may transmit and receive data with each other based on convolutional connection relationships thereof while being located in different layers. Examples of the neural network models may include various deep learning techniques, such as deep neural networks (DNN), convolutional deep neural networks (CNN), a recurrent Boltzmann machine (RNN), a restricted Boltzmann machine (RBM), deep belief networks (DBN), a deep Q-network, and the like.

The memory 400 may store an artificial intelligence learning model, and an algorithm for interpreting information acquired by the sensor device 100.

The memory 400 may be equipped in the processor 300, or may be a separate memory. For example, the memory 400 may include a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double date rate-SDRAM (DDR-SDRAM), and the like.

The user interface device 500, which may be for receiving a user input from the passenger and providing specific information to a user, may include a voice recognition device 510, a speaker 520, a display device 530, and a haptic device 540.

The voice recognition device 510 and a motion recognition device may be included in an input interface. The motion recognition device may include an algorithm of the processor 300 that operates based on a user gesture of the passenger acquired by the camera 130. Therefore, the camera 130 may be the motion recognition device of the input interface. Herein, activating of the motion recognition device may be referred to as activating of the camera.

The speaker 520, the display device 530, and the haptic device 540 may be included in an output interface. The display device 530 may perform a function of the input interface that receives the user input via a touch screen while being the output interface that displays a specific image to the user.

The voice recognition device 510 may convert a voice signal input via a microphone into text data using a speech to text (STT) technique. The voice recognition device 510 may analyze a meaning of the converted text using a natural language understanding (NLU) technique and outputs a voice recognition result.

The speaker 520 may convert an electrical signal provided from the processor 300 into an audio signal and output the audio signal.

The display device 530 may display graphic objects corresponding to various information. The display device 530 may use a liquid crystal display (LCD), an organic light-emitting diode (OLED), a flexible display, a projection, and the like.

The display device 530 may be implemented as a head up display (HUD). When the display device 530 is implemented as the HUD, the display device 530 may include a projection module to output information via an image projected onto a windshield or a window. The display device 530 may include a transparent display. The transparent display may be coupled to the windshield or the window, but a placement position thereof may not be limited thereto. The transparent display may use a structure in which an OLED display portion is formed in a partial region of a panel and a transparent portion is formed in another partial region.

The display device 530 may include a plurality of displays. For example, the display device 530 may include first to third displays 530*a*, 530*b*, and 530*c*. The first display 530*a* may be of a projection type as in FIG. 2, the second display 530*b* may be coupled to the seat as in FIGS. 4 and 5, and the third display 530*c* may be coupled to a cluster as in FIG. 10.

The second and third displays 530*b* and 530*c* may receive the user input by being coupled to the touch screens. Accordingly, herein, an operation of activating the touch screen may refer to a procedure of activating one of the second display 530*b* and the third display 530*c*.

The display device 530 may be formed on a steering wheel, in an inner region of each pillar, an inner region of a door, an inner region of the windshield, and an inner region of the window.

The haptic device 540 may generate a tactile output. For example, the haptic device 540 may vibrate the steering wheel, a seat belt, and the seat, so that a specific function or operation of a specific device may be recognized by the passenger.

Figure 2:
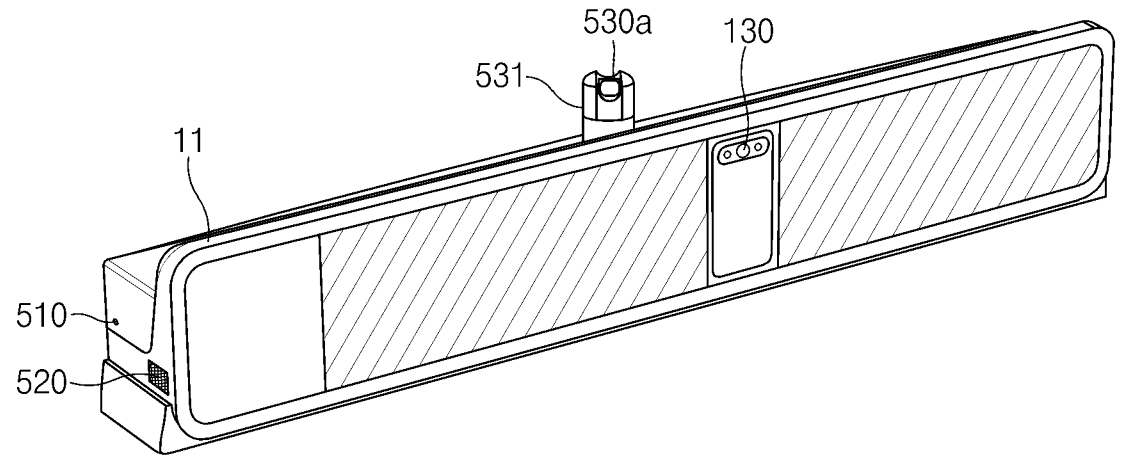
FIG. 2 and FIG. 3 are diagrams showing a user interface control device.
Figure 3:
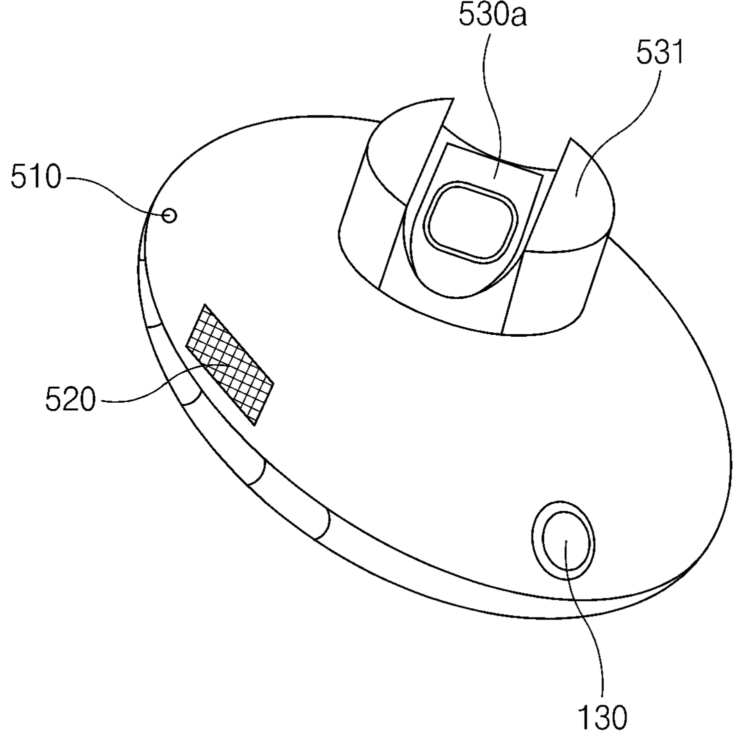

FIGS. 2 and 3 are diagrams showing a user interface control device.

Referring to FIGS. 1 and 2, components in the user interface control device 10 may be implemented integrally by being coupled to an inner portion or an outer portion of a housing 11. The housing 11 may be in a form of a rectangular bar.

The housing 11 may be coupled to a vehicle VEH such that a front surface thereof is directed toward a region in which the passenger may be located inside the vehicle VEH.

The camera 130 may be mounted on the front surface of the housing 11.

The microphone 510 and the speaker 520 may be mounted on one surface of the housing 11.

The camera 130 may be rotatably coupled to a movable body 531, and the movable body 531 may be coupled to the housing 11. Accordingly, an angle of view of the camera 130 may cover an entire region inside the vehicle VEH.

The processor 300 and the memory 400 may be mounted inside the housing 11, and other components may be mounted on the housing 11 or coupled to the housing 11.

Referring to FIG. 3, in the user interface control device, a plane of the housing 11 may be formed in an elliptical or circular shape, and the housing 11 may be detachable from the inside of the vehicle VEH.

The camera 130 may be formed to be exposed to the outside of the housing 11.

The microphone 510 and the speaker 520 may be mounted on one surface of the housing 11.

The camera 130 may be rotatably coupled to the movable body 531, and the movable body 531 may be coupled to the housing 11. Accordingly, the angle of view of the camera 130 may cover the entire region inside the vehicle VEH.

The processor 300 and the memory 400 may be mounted inside the housing 11, and other components may be mounted on the housing 11 or coupled to the housing 11.

Figure 4:
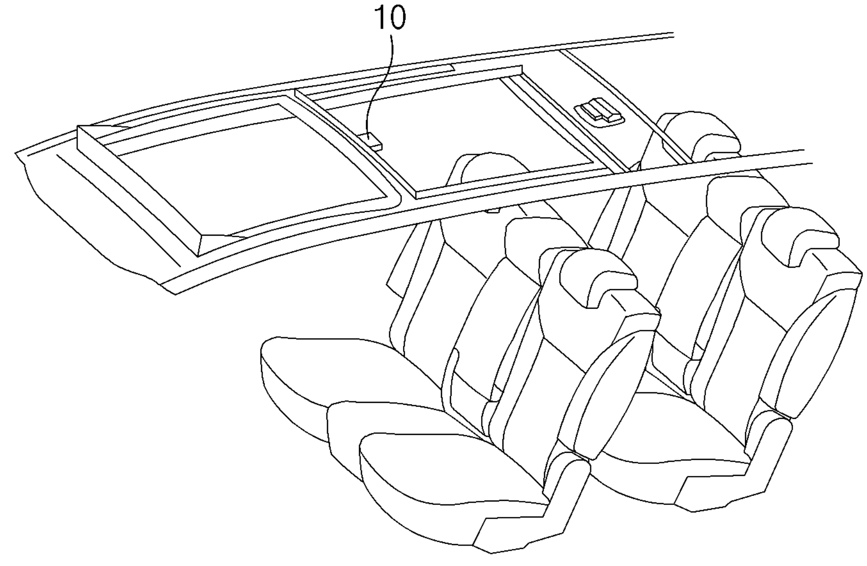
FIG. 4 and FIG. 5 are diagrams showing an example user interface control device that is installed in a vehicle.
Figure 5:
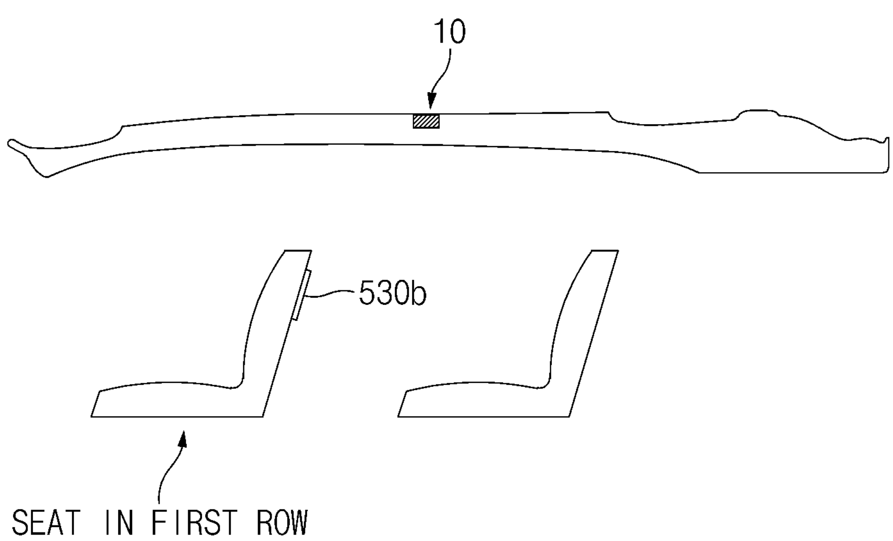

FIGS. 4 and 5 are diagrams showing an example user interface control device that is installed in a vehicle.

Referring to FIGS. 4 and 5, the user interface control device 10 may be installed at a center of a ceiling of the vehicle to facilitate monitoring of the entire region inside the vehicle VEH. The user interface control device 10 may be coupled to a device for opening/closing a sunroof.

The user interface control device 10 may operate in association with the second display 530*b* mounted on a rear surface of the seat in addition to the first display 530*a* coupled to the housing 11. For example, the second display 530*b* may be activated under control of the user interface control device 10.

Figure 6:
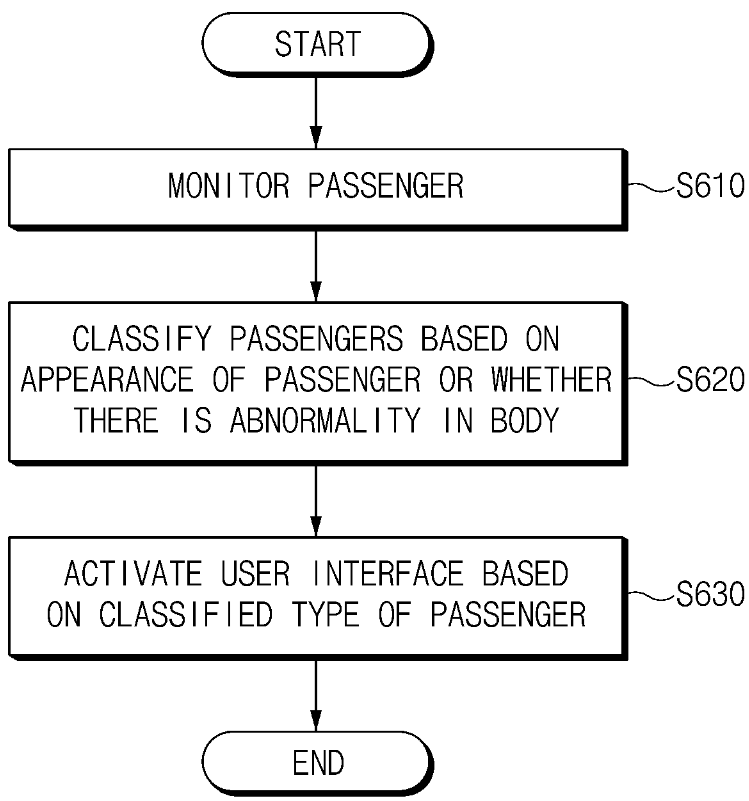
FIG. 6 is a flowchart illustrating an operation of a user interface control device.

FIG. 6 is a flowchart illustrating an operation of a user interface control device. Procedures illustrated in FIG. 6 may be understood as operations of the processor 300 for controlling the user interface device 500.

A method for controlling the user interface device will be described as follows with reference to FIG. 6.

In S610, the processor 300 may monitor the passenger in the vehicle.

To this end, the processor 300 may receive the information of the passenger from the sensor device 100.

The processor 300 may be provided with the image of the passenger acquired by the camera 130.

In S620, the processor 300 may determine the type of passenger based on the appearance of the passenger or whether there is the abnormality in the passenger's body on the basis of the monitoring result.

The determining of the type of passenger may include determining an age of the passenger.

The determining of the type of passenger may include determining a degree of freedom of the passenger's body. The degree of freedom of the body may be calculated to be low in proportion to factors that limit activities of the passenger. For example, when the passenger is pregnant or there is a limit in a body movement caused by a cast or the like, the degree of freedom of the body may be lowered.

The determining of the type of passenger may include determining a body size of the passenger.

The determining of the type of passenger may include determining whether there is the abnormality in the passenger's body. For example, the processor 300 may determine whether the passenger has a visual impairment, a hearing impairment, or an arm impairment.

The determining of the type of passenger may include determining a behavior pattern of the passenger. For example, the processor 300 may determine whether the passenger is eating food, whether the passenger is lying down, and the like.

The determining of the type of passenger may include determining a sitting position of the passenger.

The processor 300 may identify personal information of the passenger to determine the type of passenger. The processor 300 may control the speaker 520 or the display device 530 to make a request for provision of the personal information to the passenger.

In S630, the processor 300 may select the user interface to be activated differently based on the type of passenger. The processor 300 may activate the user interface device 500 such that the task completion time (TCT) for controlling the user interface may be shortened.

The processor 300 may activate the camera 130 for motion recognition or the voice recognition device 510 when the degree of freedom of the passenger's body is equal to or lower than a critical degree of freedom. For example, when the passenger is pregnant or has difficulty moving because of bodily injury, the task completion time may increase to control a direct manipulation-type input device such as a cockpit module or the touch screen that is away from the sitting position. Accordingly, the processor 300 may activate the motion recognition device or the voice recognition device 510 when the passenger has the difficulty moving. In addition, because voice recognition may be inconvenient when breathing is difficult like in a case of the pregnant woman, the motion recognition device may be activated.

The processor 300 may activate the voice recognition device 510 when the age of the passenger is equal to or higher than a first critical age or equal to or lower than a second critical age. An elderly passenger may feel difficult to control the direct manipulation-type input device, and it may not be easy for the elderly passenger to utilize the motion recognition device, which requires learning of a predetermined pattern. If the passenger is an infant, it may be difficult for the passenger to control the direct manipulation-type input device because of restraint by a car seat or the seat belt. Accordingly, the processor 300 may activate the voice recognition device 510 so as to reduce the task completion time when the passenger is the elderly person or the infant. When the passenger determined to be the infant is old enough to control the motion recognition, the processor 300 may activate the motion recognition device as the input interface.

If it is determined that the passenger has the visual impairment or the arm impairment, the processor 300 may activate the voice recognition device 510. When the passenger has the visual impairment or the arm impairment, it may not be easy to control the motion recognition device as well as the direct manipulation-type input device. Accordingly, when it is determined that the passenger has the visual impairment or the arm impairment, the processor 300 may activate the voice recognition device 510 so as to reduce the task completion time.

If it is determined that the passenger has the hearing impairment, the processor 300 may activate at least one of the camera 130 for the motion recognition and the touch screen. When the passenger has the hearing impairment, because the voice recognition is difficult, the processor 300 may activate the camera 130 or the touch screen to reduce the task completion time.

The processor 300 may display a display image at a position facing a face of the passenger. For example, when the passenger is lying down, the processor 300 may map the image on the ceiling of the vehicle using the first display 530*a*.

The processor 300 may activate the speaker 520 when it is determined that the passenger is eating.

The processor 300 may activate a display matching the sitting position of the passenger.

Figure 7:
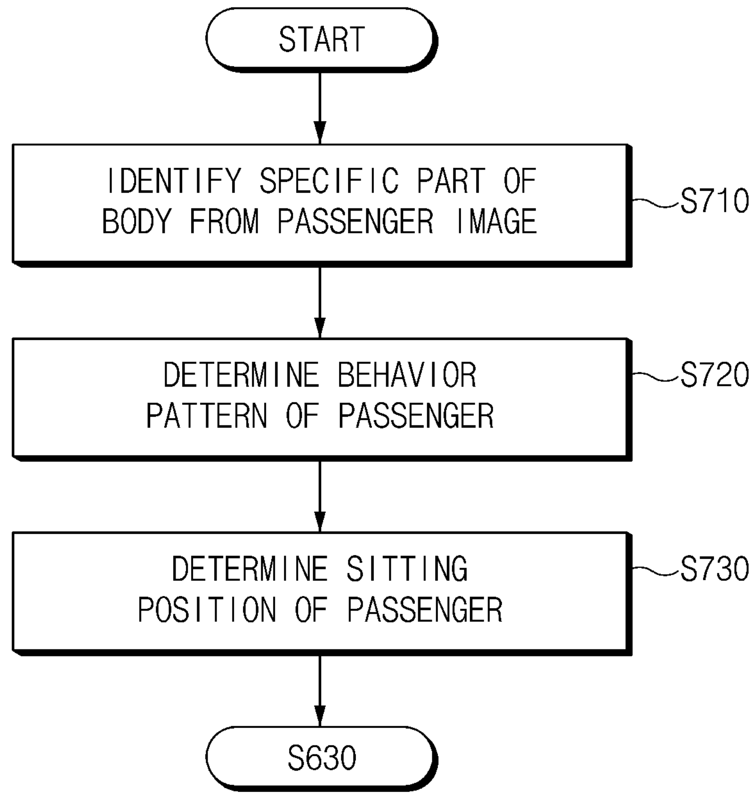
FIG. 7 is a flowchart illustrating a procedure of determining a type of passenger.

FIG. 7 is a flowchart illustrating a procedure of determining a type of passenger.

The procedure of determining the type of passenger will be described as follows with reference to FIG. 7.

In S710, the processor 300 may perform a learning process associated with one or more body parts (hereinafter, it may be referred to as learning a specific part of the body from the passenger image, etc.). The processor 300 may detect/learn a preset body part and/or a specific object connected to the body part from the passenger image provided from the camera 130. The processor 300 may perform a learning process to determine an abnormality associated with the preset body part and/or the specific object.

The preset body part may be a part with a large variety depending on the user, and, for example, a face, a stomach, and the like may be selected as the preset body part. The processor 300 may perform a learning process associated with body parts of arms and legs (hereinafter, the learning process may be referred to as learning body parts, etc.) to determine abnormality in a user's body. The specific object connected to the body part, which is for determining the abnormality in the user's body, may be assistive devices (e.g., disability assistive devices, a cane, crutches, glasses, a walking stick, a medical device, an arm cast etc.), and the like.

The processor 300 may classify the types of passengers by learning the specific part of the body and the specific object.

For example, the processor 300 may determine the infant or the weak and the elderly by learning a height, a posture, and a facial part of the passenger.

The processor 300 may determine the person having difficulty moving, such as the pregnant woman, by learning the face, the stomach, the posture, and the like of the passenger.

The processor 300 may determine the visual impairment by learning the cane or the like.

The processor 300 may determine the hearing impairment by learning a hearing aid, a sign language using motion, and the like.

The processor 300 may detect/learn the arms to determine the arm impairment. The processor 300 may perform a learning process to determine that the arm(s) are impaired or not.

The processor 300 may determine passengers except for specific user types, such as the weak and the elderly, the infant, the passenger having the difficulty moving, the visual impairment, the hearing impairment, and the arm impairment as a general passenger.

Figure 8:
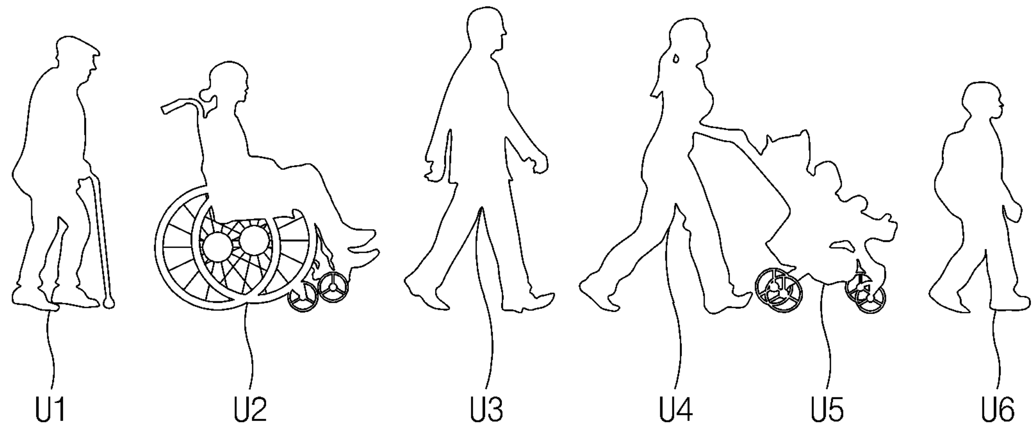
FIG. 8 is a diagram showing an example processor that classifies types of passengers based on an image.

FIG. 8 is a diagram showing an example processor that classifies types of passengers based on an image.

As in S710, the processor 300 may distinguish the passenger from the image based on characteristics of the passenger's body and assign a class (U1 to U6) to each passenger.

In S720, the processor 300 may determine the behavior pattern of the passenger.

Figure 9:
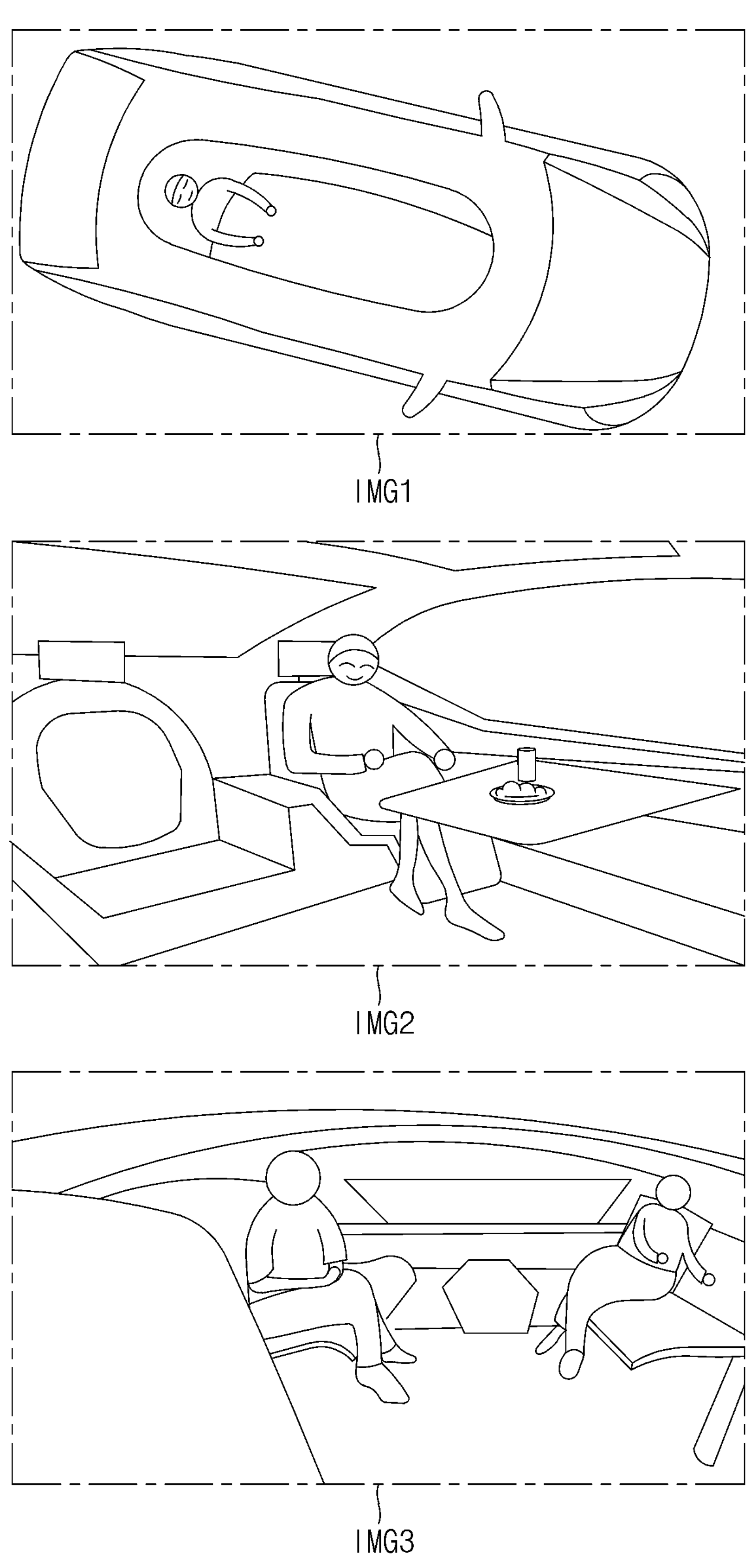
FIG. 9 is a diagram illustrating an example of behavior patterns of a passenger are classified.

FIG. 9 is a diagram illustrating an example of behavior patterns of a passenger that are classified.

Referring to FIG. 9, the processor 300 may determine a behavior pattern in which the passenger is lying down as in a first image IMG1. In addition, the processor 300 may determine whether the passenger is eating the food as in a second image IMG2. In addition, the processor 300 may determine whether two or more passengers face each other as in a third image IMG3.

In S730, the processor 300 may determine the sitting position of the passenger.

Figure 10:
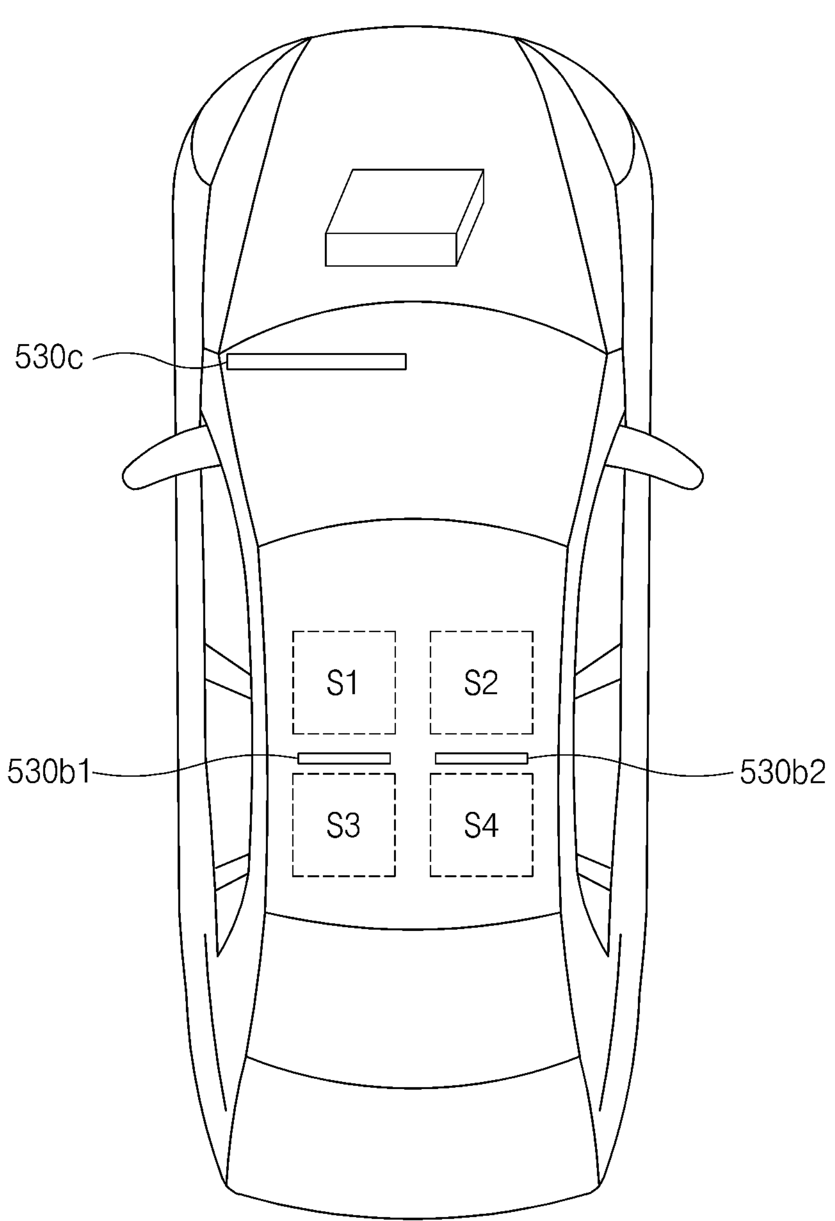
FIG. 10 is a diagram illustrating an example method for distinguishing a sitting position of a passenger.

FIG. 10 is a diagram illustrating an example method for distinguishing a sitting position of a passenger.

As shown in FIG. 10, when the vehicle (VEH) has four seats, the processor 300 may identify information for distinguishing each seat. For example, the seats may be distinguished as first to fourth seats Si to S4. The processor 300 may identify the sitting position of the passenger based on a result of learning the image.

Alternatively or additionally, the processor 300 may identify the sitting position of the passenger based on sensing information from the radar 110, the lidar 120, the pressure sensor 150 located on the seat, and the like.

In the procedure described based on FIG. 7, the image learning may be a method using a convolutional neural network (CNN). The CNN is a type of multi-layer, feed-forward artificial neural network used to analyze the visual images. The CNN is a deep neural network technique that may effectively process the image by applying a filtering technique to the artificial neural network, and is a technique for classifying the images via a process in which each element of a filter expressed in a matrix is automatically trained to be suitable for data processing.

The processor 300 may pre-define a type of user, the body characteristics, the passenger position, the behavior pattern, and the like, and learn each of those based on the CNN.

Figure 11:
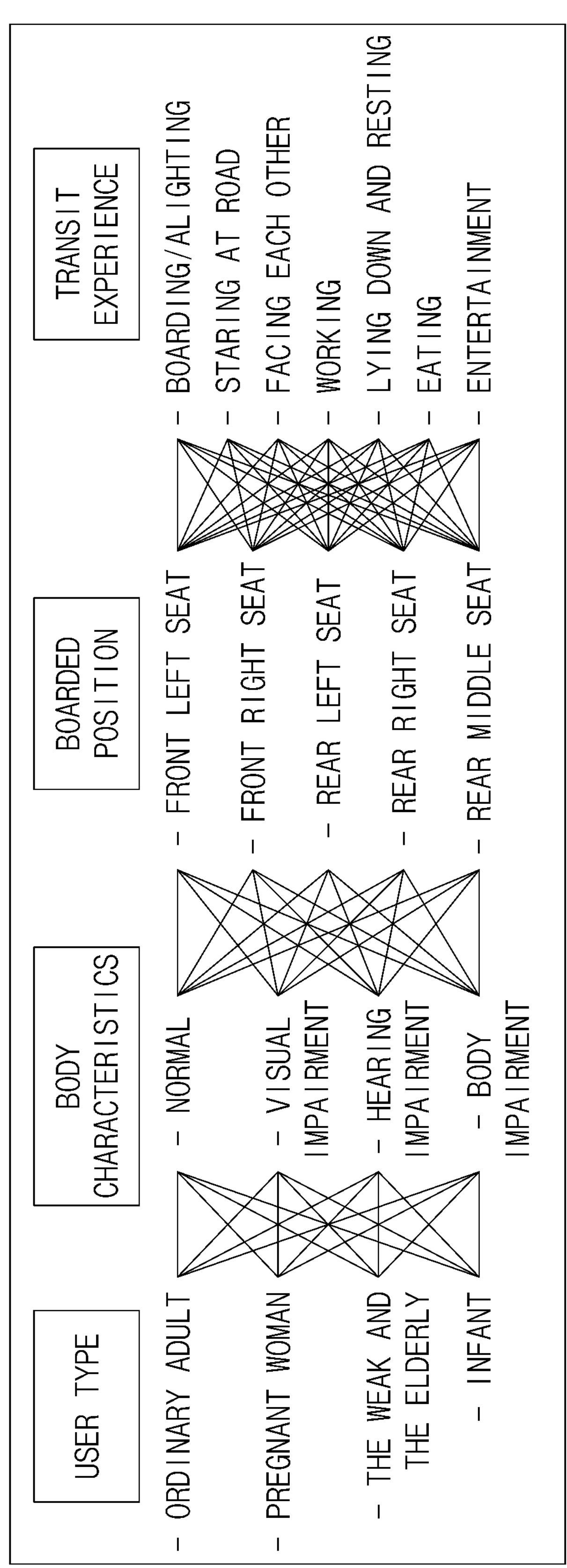
FIG. 11 is a diagram schematically illustrating a structure of an artificial neural network for image learning.

FIG. 11 is a diagram schematically illustrating a structure of an artificial neural network for image learning.

Referring to FIG. 11, the artificial neural network may include a plurality of layers, and each layer may include at least one node corresponding to the neuron of the neural network. The artificial neural network may include the synapse that connects a node of one layer to a node of another layer. In the artificial neural network, the node may receive input signals input via the synapse, and may generate an output value based on an activation function for a weight and a bias for each input signal. The output value of each node may act as an input signal for a next layer via the synapse. An artificial neural network in a case in which all nodes in one layer and all nodes in the next layer are all connected to each other via the synapses may be referred to as a fully connected artificial neural network.

A parameter of an artificial neural network model may mean a parameter determined via learning, and may include a weight of a synaptic connection, a bias of the neuron, and the like. In addition, a hyperparameter may mean a parameter to be set before the learning in a machine learning algorithm, and may include a learning rate, the number of iterations, a mini-batch magnitude, an initialization function, and the like.

FIG. 12, FIG. 13, FIG. 14, FIG. 15, FIG. 16, and FIG. 17 are flowcharts illustrating examples of controlling a user interface. FIGS. 12 to 17 may correspond to procedures after S710 in FIG. 7.

Figure 12:
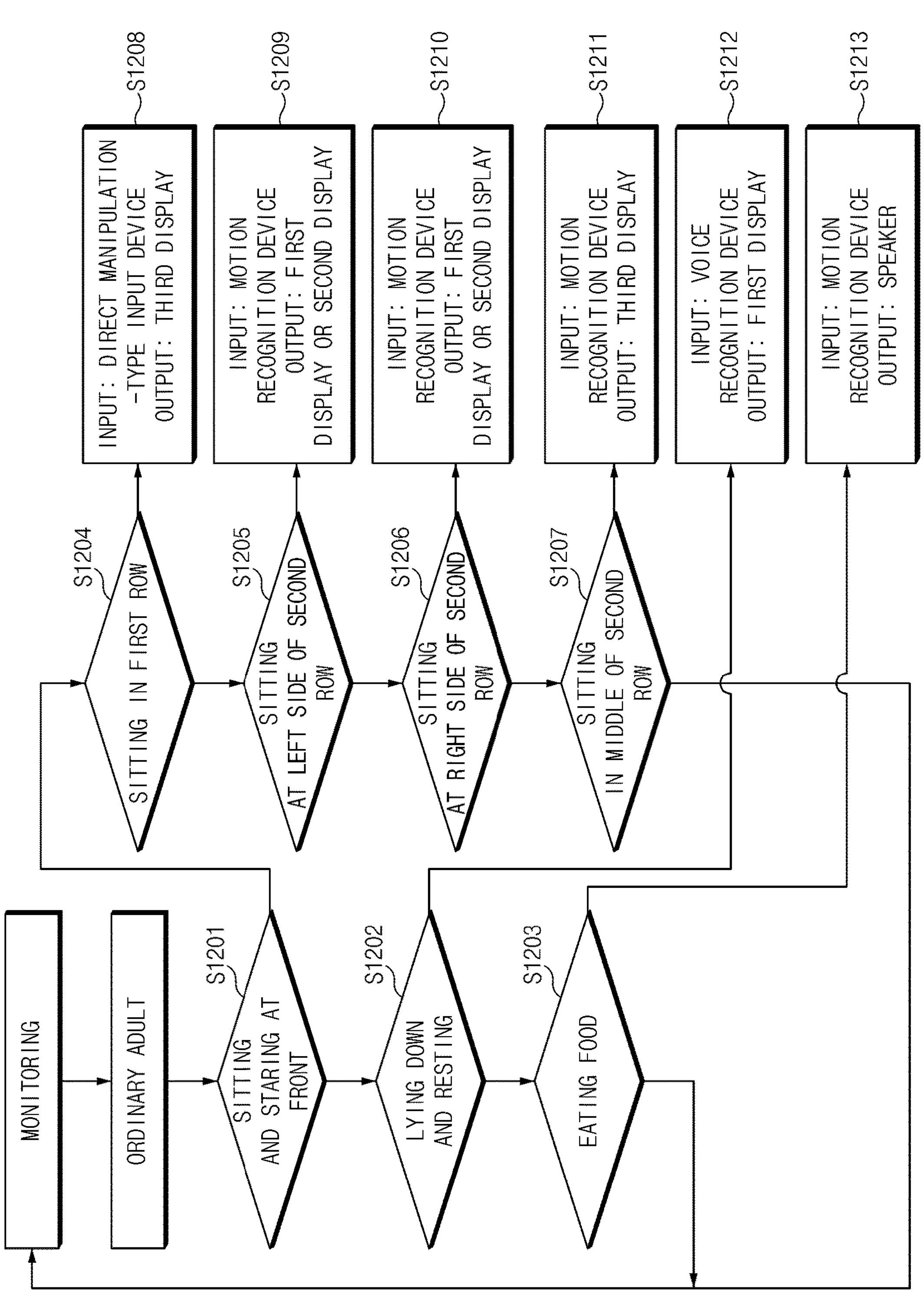
FIG. 12, FIG. 13, FIG. 14, FIG. 15, FIG. 16, and FIG. 17 are flowcharts illustrating example methods for controlling a user interface.

FIG. 12 may be procedures performed based on a result of determining that the passenger is an ordinary adult in S710.

A method for controlling the user interface will be described as follows with reference to FIG. 12.

If it is determined in S1201 that the passenger is sitting and staring at the front, the processor 300 may determine the sitting position of the passenger.

In a procedure leading to S1201, S1204, and S1208, if it is determined that the passenger is sitting and staring at the front and the user is sitting in a first row, the processor 300 may activate the direct manipulation-type input device including the third display 530*c* including a touch screen of a cluster of the input interface. The processor 300 may activate the third display 530*c* of the output interface. Because the direct manipulation-type input device has high accuracy and quick response, if the passenger is the ordinary adult who may easily control the direct manipulation-type input device, the processor 300 may directly activate the direct manipulation-type input device.

In a procedure leading to S1201, S1204, S1205, and S1209, if it is determined that the passenger is sitting and staring at the front and the user is sitting at a left side of a second row, the processor 300 may activate the motion recognition device of the input interface. The processor 300 may activate the projection type-first display 530*a*, and a display mapping region may be set to a region at the rear of a left seat in the first row. Alternatively or additionally, the processor 300 may activate a second display 530*b*1 coupled to the left seat in the first row of the output interface.

In a procedure leading to S1201, S1204, S1205, S1206, and S1210, if it is determined that the passenger is sitting and staring at the front and the user is sitting at a right side of the second row, the processor 300 may activate the motion recognition device of the input interface. The processor 300 may activate the projection-type first display 530*a*, and the display mapping region may be set to a region at the rear of a right seat in the first row. Alternatively or additionally, the processor 300 may activate a second display 530*b*2 coupled to the right seat in the first row of the output interface.

In a procedure leading to S1201, S1204, S1205, S1206, S1207, and S1211, if it is determined that the passenger is sitting and staring at the front and the user is sitting in a middle of the second row, the processor 300 may activate the motion recognition device of the input interface. The processor 300 may activate the third display 530*c* of the cluster of the output interface.

In S1202 and S1212, if it is determined that the passenger is lying down, the processor 300 may activate the voice recognition device 510 of the input interface. The processor 300 may activate the projection-type first display 530*a* of the output interface, and set the mapping region of the display to the ceiling of the vehicle.

In S1203 and S1213, if it is determined that the passenger is eating, the processor 300 may activate the motion recognition device of the input interface. The processor 300 may activate the speaker 520 of the output interface. If the passenger is eating or drinking, because the passenger is staring at a table, the speaker 520 may be used as the output interface.

Figure 13:
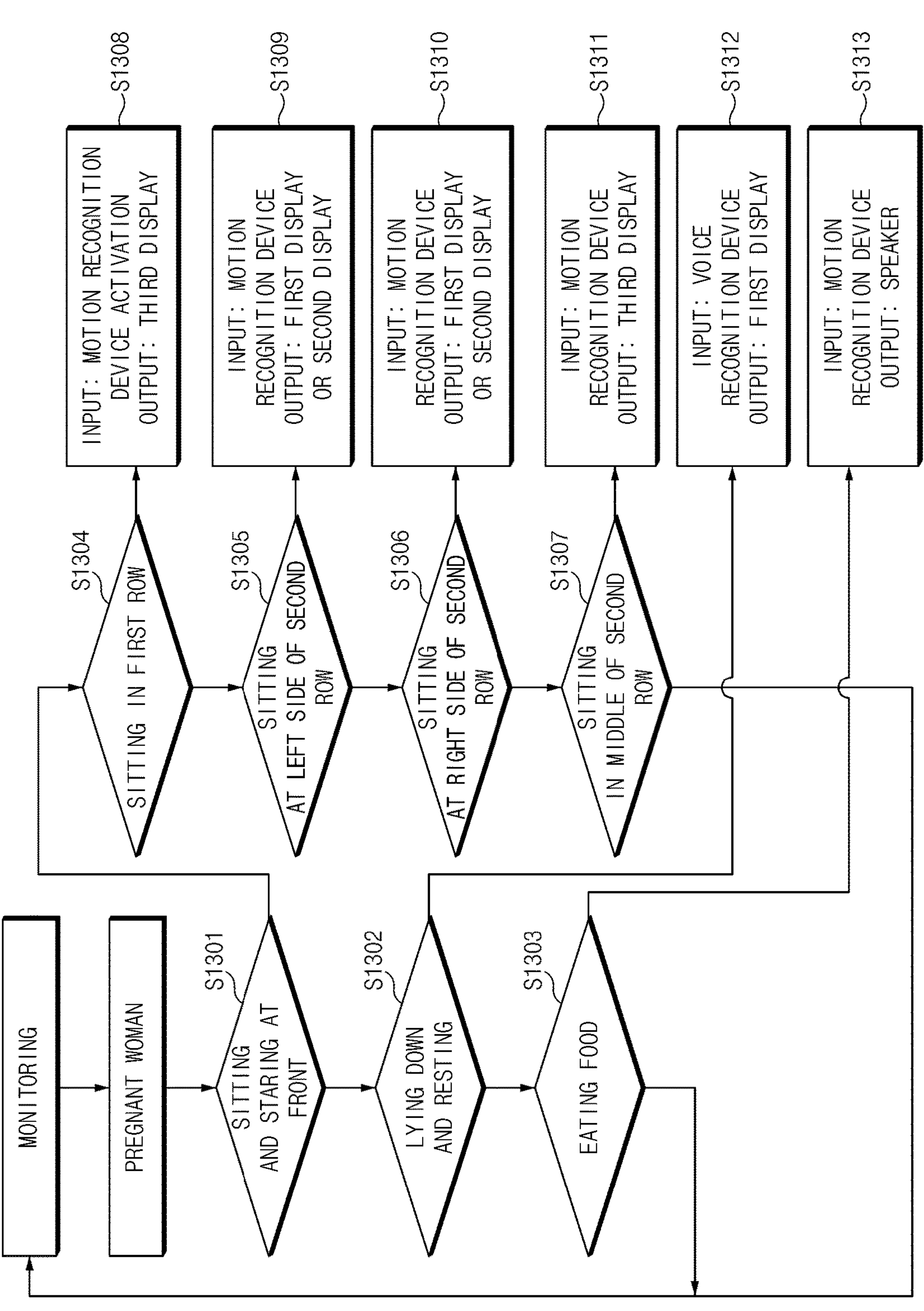

FIG. 13 may be procedures performed based on a result of determining that the passenger is the pregnant woman in S710.

The method for controlling the user interface will be described as follows with reference to FIG. 13.

If it is determined in S1301 that the passenger is sitting and staring at the front, the processor 300 may determine the sitting position of the passenger.

In a procedure leading to S1301, S1304, and S1308, if it is determined that the passenger is sitting and staring at the front and the user is sitting in the first row, the processor 300 may activate the motion recognition device of the input interface. The processor 300 may activate the third display 530*c* of the output interface.

In a procedure leading to S1301, S1304, S130S, and S1309, if it is determined that the passenger is sitting and staring at the front and the user is sitting at the left side of the second row, the processor 300 may activate the motion recognition device of the input interface. The processor 300 may activate the projection type-first display 530*a* of the output interface, and the display mapping region may be set to the region at the rear of the left seat in the first row. Alternatively or additionally, the processor 300 may activate the second display 530*b*1 coupled to the left seat in the first row of the output interface.

In a procedure leading to S1301, S1304, S1305, S1306, and S1310, if it is determined that the passenger is sitting and staring at the front and the user is sitting at the right side of the second row, the processor 300 may activate the motion recognition device of the input interface. The processor 300 may activate the projection-type first display 530*a*, and the display mapping region may be set to the region at the rear of the right seat in the first row. Alternatively or additionally, the processor 300 may activate the second display 530*b*2 coupled to the right seat in the first row of the output interface.

In a procedure leading to S1301, S1304, S1305, S1306, S1307, and S1311, if it is determined that the passenger is sitting and staring at the front and the user is sitting in the middle of the second row, the processor 300 may activate the motion recognition device of the input interface. The processor 300 may activate the third display 530*c* of the cluster of the output interface.

In S1302 and S1312, if it is determined that the passenger is lying down, the processor 300 may activate the voice recognition device 510 of the input interface. The processor 300 may activate the projection-type first display 530*a* of the output interface, and set the mapping region of the display to the ceiling of the vehicle.

In S1303 and S1313, if it is determined that the passenger is eating, the processor 300 may activate the motion recognition device of the input interface. The processor 300 may activate the speaker 520 of the output interface.

Figure 14:
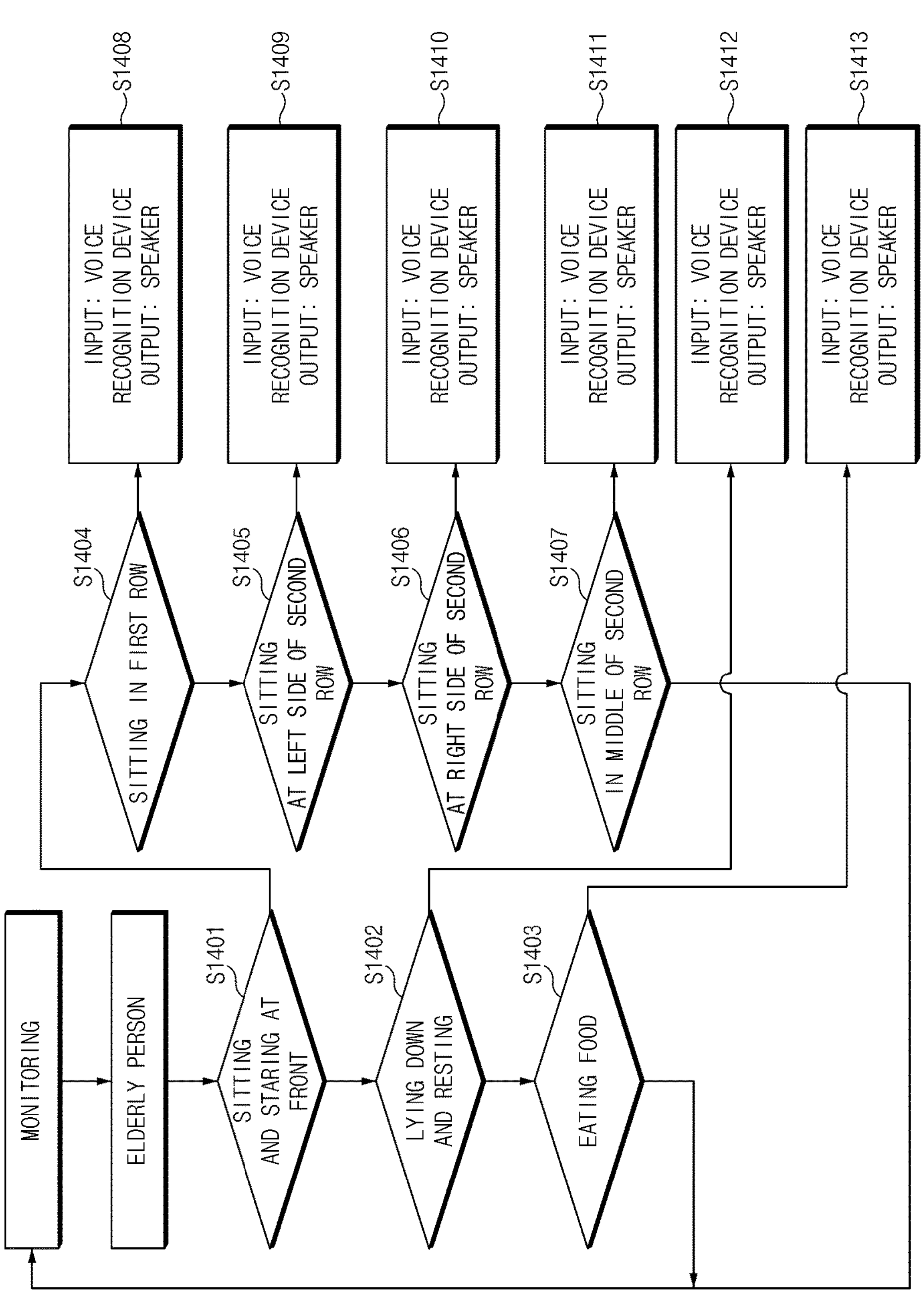

FIG. 14 may be procedures performed based on a result of determining that the passenger is the elderly person in S710.

The method for controlling the user interface will be described as follows with reference to FIG. 14.

If it is determined in S1401 that the passenger is sitting and staring at the front, the processor 300 may determine the sitting position of the passenger.

In a procedure leading to S1401, S1404, and S1408, if it is determined that the passenger is sitting and staring at the front and the user is sitting in the first row, the processor 300 may activate the motion recognition device of the input interface. The processor 300 may activate the speaker 520 of the output interface.

In a procedure leading to S1401, S1404, S1405, and S1409, if it is determined that the passenger is sitting and staring at the front and the user is sitting at the left side of the second row, the processor 300 may activate the voice recognition device 510 of the input interface. The processor 300 may activate the speaker 520 of the output interface.

In a procedure leading to S1401, S1404, S1405, S1406, and S1410, if it is determined that the passenger is sitting and staring at the front and the user is sitting at the right side of the second row, the processor 300 may activate the voice recognition device 510 of the input interface. The processor 300 may activate the speaker 520 of the output interface.

In a procedure leading to S1401, S1404, S1405, S1406, S1407, and S1411, if it is determined that the passenger is sitting and staring at the front and the user is sitting in the middle of the second row, the processor 300 may activate the voice recognition device 510 of the input interface. The processor 300 may activate the speaker 520 of the output interface.

In S1402 and S1412, if it is determined that the passenger is lying down, the processor 300 may activate the voice recognition device 510 of the input interface. The processor 300 may activate the speaker 520 of the output interface.

In S1403 and S1413, if it is determined that the passenger is eating, the processor 300 may activate the voice recognition device 510 of the input interface. Even while eating, the elderly passenger may be more comfortable using the voice recognition device 510 than using the motion recognition device. The processor 300 may activate the speaker 520 of the output interface.

Figure 15:
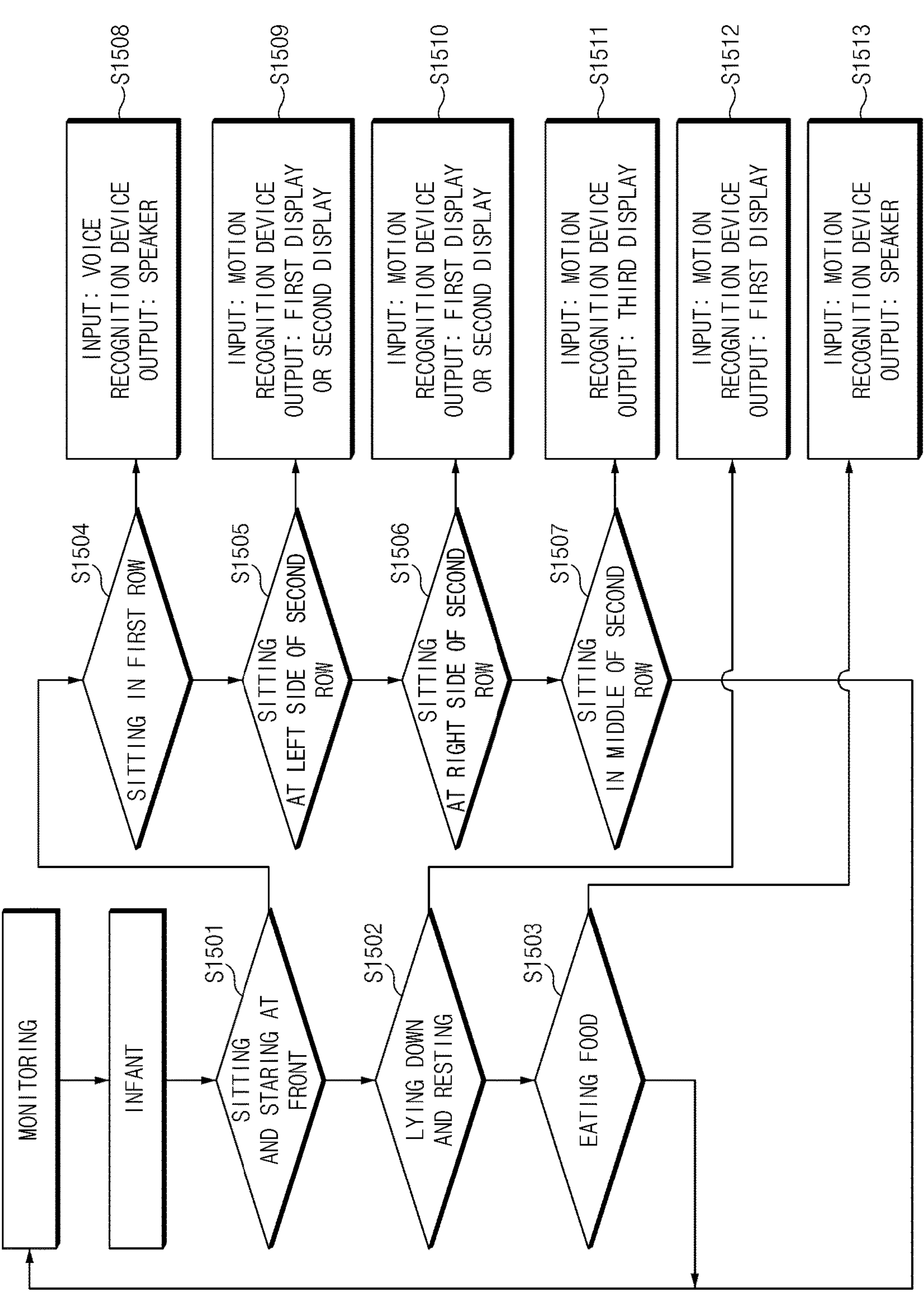

FIG. 15 may be procedures performed based on a result of determining that the passenger is the infant in S710. For example, FIG. 15 is a diagram for illustrating a method for controlling a user interface for a passenger with a small body size.

The method for controlling the user interface will be described as follows with reference to FIG. 15.

If it is determined in S1501 that the passenger is sitting and staring at the front, the processor 300 may determine the sitting position of the passenger.

In a procedure leading to S1501, S1504, and S1508, if it is determined that the passenger is sitting and staring at the front and the user is sitting in the first row, the processor 300 may activate the voice recognition device 510 of the input interface. The processor 300 may activate the speaker 520 of the output interface.

In a procedure leading to S1501, S1504, S1505, and S1509, if it is determined that the passenger is sitting and staring at the front and the user is sitting at the left side of the second row, the processor 300 may activate the voice recognition device 510 of the input interface. The processor 300 may activate the projection type-first display 530*a* of the output interface, and the display mapping region may be set to the region at the rear of the left seat in the first row. Alternatively or additionally, the processor 300 may activate the second display 530*b*1 coupled to the left seat in the first row of the output interface.

In a procedure leading to S1501, S1504, S1505, S1506, and S1510, if it is determined that the passenger is sitting and staring at the front and the user is sitting at the right side of the second row, the processor 300 may activate the voice recognition device 510 of the input interface. The processor 300 may activate the projection-type first display 530*a* of the output interface, and the display mapping region may be set to the region at the rear of the right seat in the first row. Alternatively or additionally, the processor 300 may activate the second display 530*b*2 coupled to the right seat in the first row of the output interface.

In a procedure leading to S1501, S1504, S1505, S1506, S1507, and S1511, if it is determined that the passenger is sitting and staring at the front and the user is sitting in the middle of the second row, the processor 300 may activate the voice recognition device 510 of the input interface. The processor 300 may activate the third display 530*c* of the cluster of the output interface.

In S1502 and S1512, if it is determined that the passenger is lying down, the processor 300 may activate the motion recognition device of the input interface. The processor 300 may activate the projection-type first display 530*a* of the output interface, and set the mapping region of the display to the ceiling of the vehicle.

In S1503 and S1513, if it is determined that the passenger is eating, the processor 300 may activate the motion recognition device of the input interface. The processor 300 may activate the speaker 520 of the output interface.

Figure 16:
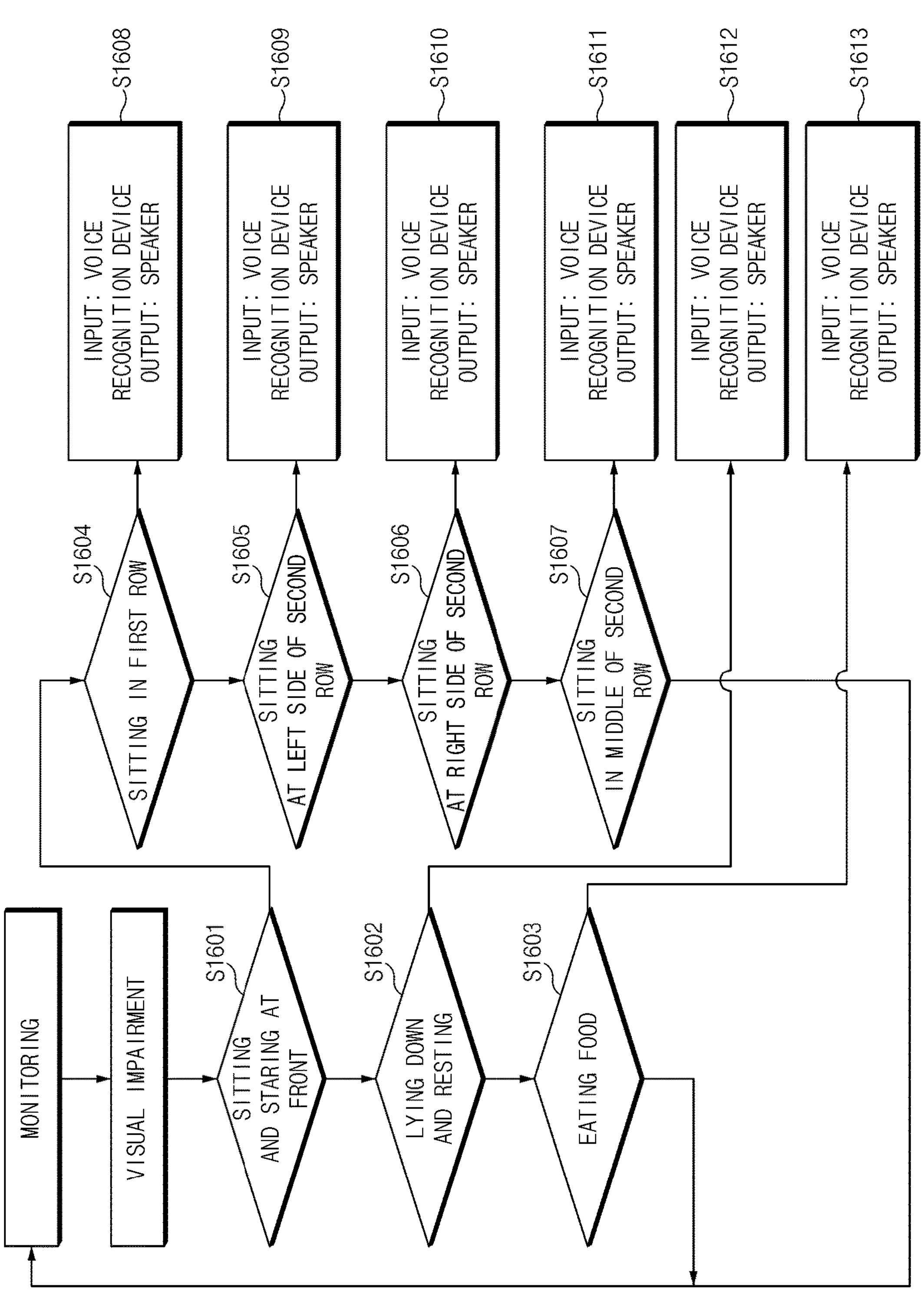

FIG. 16 may be procedures performed based on a result of determining that the passenger has the visual impairment or the arm impairment in S710.

The method for controlling the user interface will be described as follows with reference to FIG. 16.

If it is determined in S1601 that the passenger is sitting and staring at the front, the processor 300 may determine the sitting position of the passenger.

In a procedure leading to S1601, S1604, and S1608, if it is determined that the passenger is sitting and staring at the front and the user is sitting in the first row, the processor 300 may activate the voice recognition device 510 of the input interface. The processor 300 may activate the speaker 520 of the output interface.

In a procedure leading to S1601, S1604, S1605, and S1609, if it is determined that the passenger is sitting and staring at the front and the user is sitting at the left side of the second row, the processor 300 may activate the voice recognition device 510 of the input interface. The processor 300 may activate the speaker 520 of the output interface.

In a procedure leading to S1601, S1604, S1605, S1606, and S1610, if it is determined that the passenger is sitting and staring at the front and the user is sitting at the right side of the second row, the processor 300 may activate the voice recognition device 510 of the input interface. The processor 300 may activate the speaker 520 of the output interface.

In a procedure leading to S1601, S1604, S1605, S1606, S1607, and S1611, if it is determined that the passenger is sitting and staring at the front and the user is sitting in the middle of the second row, the processor 300 may activate the voice recognition device 510 of the input interface. The processor 300 may activate the speaker 520 of the output interface.

In S1602 and S1612, if it is determined that the passenger is lying down, the processor 300 may activate the voice recognition device 510 of the input interface. The processor 300 may activate the speaker 520 of the output interface.

In S1603 and S1613, if it is determined that the passenger is eating, the processor 300 may activate the voice recognition device of the input interface. If the passenger has the visual impairment or has the arm impairment, even while eating, the voice recognition may more reduce the task completion time than motion recognition, the processor 300 may determine the voice recognition device as the input interface.

The processor 300 may activate the speaker 520 of the output interface.

Figure 17:
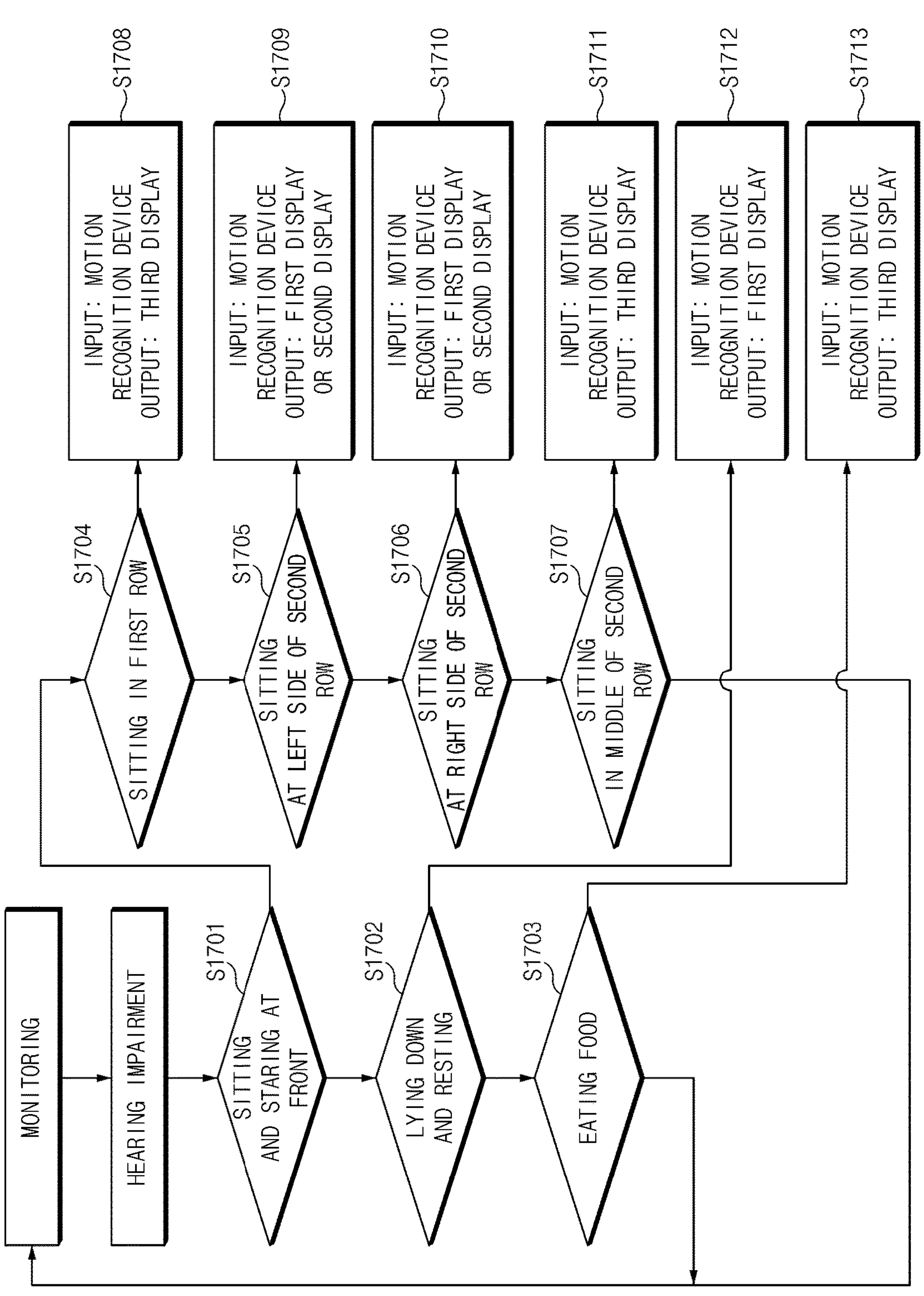

FIG. 17 may be procedures performed based on a result of determining that the passenger has the hearing impairment in S710.

The method for controlling the user interface will be described as follows with reference to FIG. 17.

If it is determined in S1701 that the passenger is sitting and staring at the front, the processor 300 may determine the sitting position of the passenger.

In a procedure leading to S1701, S1704, and S1708, if it is determined that the passenger is sitting and staring at the front and the user is sitting in the first row, the processor 300 may activate the motion recognition device of the input interface. The processor 300 may activate the third display 530*c* of the output interface.

In a procedure leading to S1701, S1704, S1705, and S1709, if it is determined that the passenger is sitting and staring at the front and the user is sitting at the left side of the second row, the processor 300 may activate the motion recognition device of the input interface. The processor 300 may activate the projection type-first display 530*a* of the output interface, and the display mapping region may be set to the region at the rear of the left seat in the first row. Alternatively or additionally, the processor 300 may activate the second display 530*b*1 coupled to the left seat in the first row of the output interface.

In a procedure leading to S1701, S1704, S1705, S1706, and S1710, if it is determined that the passenger is sitting and staring at the front and the user is sitting at the right side of the second row, the processor 300 may activate the motion recognition device of the input interface. The processor 300 may activate the projection-type first display 530*a* of the output interface, and the display mapping region may be set to the region at the rear of the right seat in the first row. Alternatively or additionally, the processor 300 may activate the second display 530*b*2 coupled to the right seat in the first row of the output interface.

In a procedure leading to S1701, S1704, S1705, S1706, S1707, and S1711, if it is determined that the passenger is sitting and staring at the front and the user is sitting in the middle of the second row, the processor 300 may activate the motion recognition device of the input interface. The processor 300 may activate the third display 530*c* of the cluster of the output interface.

In S1702 and S1712, if it is determined that the passenger is lying down, the processor 300 may activate the motion recognition device of the input interface. The processor 300 may activate the projection-type first display 530*a* of the output interface, and set the mapping region of the display to the ceiling of the vehicle.

In S1703 and S1713, if it is determined that the passenger is eating, the processor 300 may activate the motion recognition device of the input interface. The processor 300 may activate the speaker 520 of the output interface.

Figure 18:
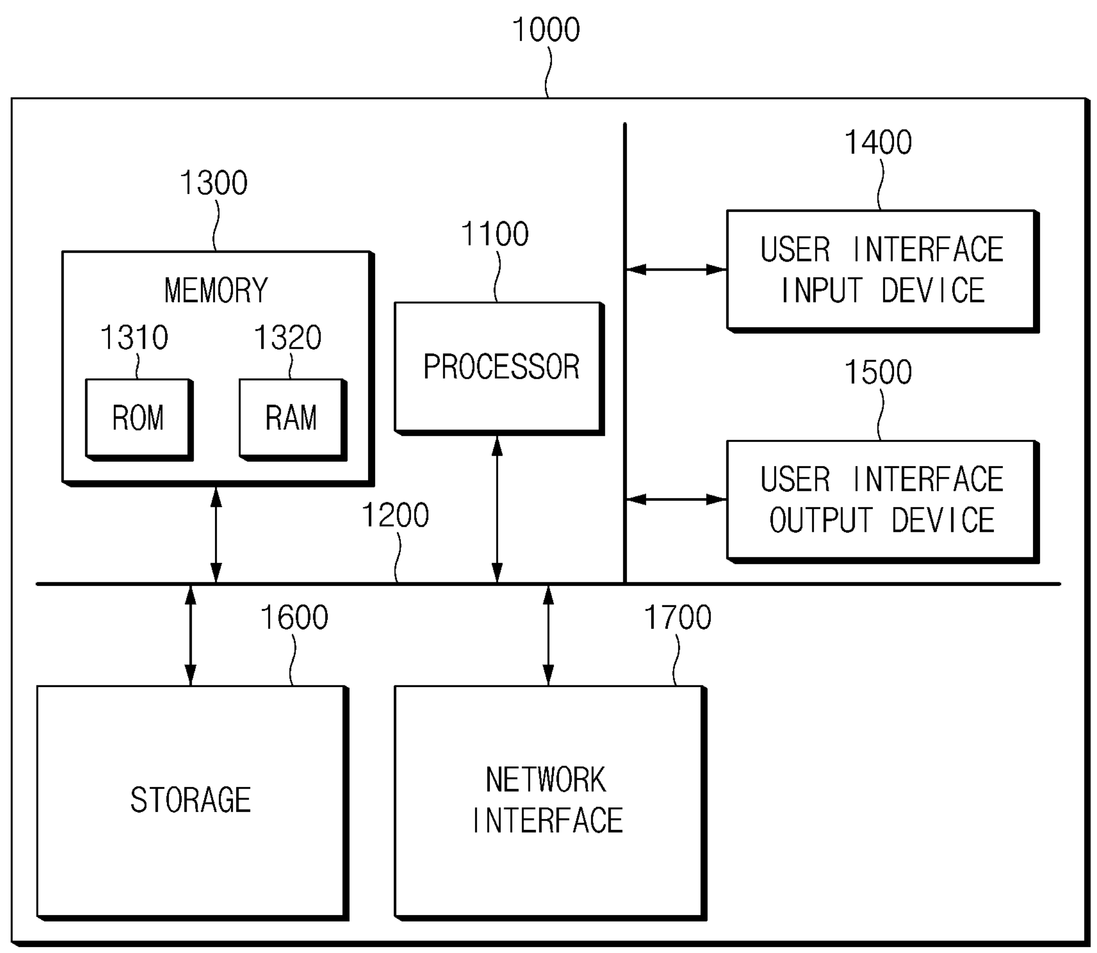
FIG. 18 shows a computing system.

FIG. 18 shows a computing system.

With reference to FIG. 18, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600, and may control the user interface device based on the type of passenger. The memory 1300 and the storage 1600 may include various types of volatile or non-volatile storage media. For example, the memory 1300 may include a ROM (Read Only Memory) and a RAM (Random. Access Memory).

Thus, the operations of the method or the algorithm described in connection with the features disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the examples disclosed in the present disclosure are not intended to limit the technical idea of the present disclosure but to illustrate the present disclosure, and the scope of the technical idea of the present disclosure is not limited by the illustrated examples. The scope of the present disclosure should be construed as being covered by the scope of the appended claims, and all technical ideas falling within the scope of the claims should be construed as being included in the scope of the present disclosure.

According to an aspect of the present disclosure, a device for controlling a user interface includes a sensor device for acquiring information of a passenger boarded a mobility, a user interface device for providing means of communication between the mobility and the passenger, and a processor. The processor monitors the passenger based on the information of the passenger to determine a type of passenger based on whether there is an abnormality in an appearance or a body of the passenger. In addition, the processor selects a user interface to be activated of the user interface device differently based on the type of passenger such that a task completion time is shortened.

In an implementation, the sensor device may include a camera for acquiring an image of the passenger, and the processor may perform artificial intelligence learning of a preset body part or a specific object connected to the body part in the image, and determine at least one of an age of the passenger and a degree of freedom of the body of the passenger.

In an implementation, the processor may activate a motion recognition device or a voice recognition device of the user interface device when the degree of freedom of the body of the passenger is equal to or lower than a critical degree of freedom.

In an implementation, the processor may activate a voice recognition device of the user interface device when the age of the passenger is equal to or higher than a first critical age or equal to or lower than a second critical age.

In an implementation, the processor may determine whether there is the abnormality in the body of the passenger based on a result of the learning, and activate a voice recognition device of the user interface device when it is determined that the passenger has a visual impairment or an arm impairment.

In an implementation, the processor may activate at least one of a touch screen and a motion recognition device of the user interface device when it is determined that the passenger has a hearing impairment.

In an implementation, the processor may identify personal information of the passenger to determine whether there is the abnormality in the body of the passenger.

In an implementation, the processor may determine a behavior pattern of the passenger, and display a display image at a position facing a face of the passenger.

In one implementation, the processor may activate a speaker of the user interface device when it is determined that the passenger is eating.

In an implementation, the processor may activate a display matching a sitting position of the passenger of the user interface device, and activate a voice recognition device or a motion recognition device for a passenger sitting at a position other than a first row where a driver's seat is located.

According to an aspect of the present disclosure, a method for controlling a user interface includes monitoring a passenger boarded a mobility, determining a type of passenger based on whether there is an abnormality in an appearance or a body of the passenger based on a result of the monitoring, and selecting a user interface to be activated of a user interface device differently based on the type of passenger such that a task completion time for controlling the user interface device is shortened.

In an implementation, the monitoring of the passenger may include receiving an image of the passenger from a camera, and the determining of the type of passenger may include performing artificial intelligence learning of a preset body part or a specific object connected to the body part in the image, and determining at least one of an age of the passenger and a degree of freedom of the body of the passenger based on a result of the learning.

In an implementation, the selecting of the user interface to be activated of the user interface device differently may include activating a motion recognition device or a voice recognition device of the user interface device when the degree of freedom of the body of the passenger is equal to or lower than a critical degree of freedom.

In an implementation, the selecting of the user interface to be activated of the user interface device differently may include activating a voice recognition device of the user interface device when the age of the passenger is equal to or higher than a first critical age or equal to or lower than a second critical age.

In an implementation, the determining of the type of passenger may further include determining whether there is the abnormality in the body of the passenger based on a result of the learning, and the selecting of the user interface to be activated of the user interface device differently may include activating a voice recognition device of the user interface device when it is determined that the passenger has a visual impairment or an arm impairment.

In an implementation, the selecting of the user interface to be activated of the user interface device differently may include activating at least one of a touch screen and a motion recognition device of the user interface device when it is determined that the passenger has a hearing impairment.

In an implementation, the determining of whether there is the abnormality in the body of the passenger based on the result of the learning may further include identifying personal information of the passenger.

In an implementation, the determining of the type of passenger may further include determining a behavior pattern of the passenger, and the selecting of the user interface to be activated of the user interface device differently may include displaying a display image at a position facing a face of the passenger.

In an implementation, the selecting of the user interface to be activated of the user interface device differently may include activating a speaker of the user interface device when it is determined that the passenger is eating.

In an implementation, the determining of the type of passenger may further include determining a sitting position of the passenger, and the method may include activating a display matching the sitting position of the passenger of the user interface device, and activating a voice recognition device or a motion recognition device for a passenger sitting at a position other than a first row where a driver's seat is located.

According to one or more aspects of the present disclosure, as the type of passenger is determined and the user interface matching therewith is activated, the user interface optimized for each passenger may be provided.

According to one or more aspects of the present disclosure, as the user interface that may reduce the task completion time is activated based on the type of passenger, the passengers may control the user interface more quickly and conveniently.

Various effects directly or indirectly identified through this document may be provided.

Hereinabove, although the present disclosure has been described with reference to various examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device comprising:

a sensor configured to acquire information associated with a passenger of a vehicle, wherein the information comprises an image of the passenger;

a user interface device configured to receive at least one user input of the passenger; and a processor configured to:

identify, based on the image comprised in the information associated with the passenger, a type of an abnormality associated with an appearance the passenger;

determine, based on the type of the abnormality associated with the appearance of the passenger, a passenger type for the passenger;

provide, based on the passenger type for the passenger and via the user interface device, a user interface associated with the passenger type, wherein the user interface associated with the passenger type is configured to reduce a task completion time for the passenger type;

determine, based on the image of the passenger, an estimated age of the passenger; and activate, based on the estimated age of the passenger being equal to or higher than a first critical age or being equal to or lower than a second critical age, a voice recognition device associated with the user interface such that the task completion time for controlling the user interface is shortened.

2. The device of claim 1, wherein the sensor comprises a camera configured to capture the image of the passenger, and wherein the processor is further configured to:

perform an artificial intelligence learning process associated with at least one of:

a preset body part; or a specific object connected to the preset body part; and determine, based on an output of the artificial intelligence learning process, a degree of freedom of a body part of the passenger.

3. The device of claim 2, wherein the processor is further configured to activate, based on the degree of freedom of the body part of the passenger being equal to or lower than a critical degree of freedom, at least one of:

a motion recognition device associated with the user interface device; or the voice recognition device associated with the user interface device.

4. The device of claim 2, wherein the processor is further configured to:

determine, based on the artificial intelligence learning process, the abnormality associated with the appearance of the passenger; and activate, based on a determination that the passenger has a visual impairment or an arm impairment, the voice recognition device associated with the user interface device.

5. The device of claim 1, wherein the processor is further configured to activate, based on a determination that the passenger has a hearing impairment, at least one of:

a touch screen associated with the user interface device; or a motion recognition device associated with the user interface device.

6. The device of claim 1, wherein the processor is further configured to identify personal information of the passenger to determine an abnormality associated with at least one body part of the passenger, wherein the type of the abnormality is associated with a degree of freedom of a body part of the passenger and associated with a type of the body part, and wherein the processor is further configured to activate at least one user interface device having a user interface type corresponding to the type of the abnormality.

7. The device of claim 1, wherein the processor is further configured to:

determine a behavior pattern of the passenger, determine, based on characteristics of at least one body part of the passenger, one of a plurality of classes for the passenger, and display a display image on a display device at a position facing a face of the passenger, wherein different user interfaces are configured to be activated based on different passenger types respectively associated with different types of abnormality.

8. The device of claim 1, wherein the processor is further configured to activate, based on a determination that the passenger is eating or drinking, a speaker, of an output interface, and the voice recognition device.

9. The device of claim 1, wherein the processor is further configured to:

activate a display associated with a sitting position of the passenger; and activate, based on the sitting position of the passenger corresponding to a rear seat of the vehicle, at least one of:

a voice recognition device; or a motion recognition device.

10. A method performed by a device of a vehicle, the method comprising:

detecting, via at least one sensor of the vehicle, information associated with a passenger of the vehicle, wherein the information comprises an image of the passenger;

identifying, by a processor of the device and based on the image comprised in the information associated with the passenger, a type of an abnormality associated with an appearance the passenger;

determining, by the processor and based on the type of the abnormality associated with the appearance of the passenger, a passenger type for the passenger;

providing, based on the passenger type for the passenger and via a user interface device, a user interface associated with the passenger type, wherein the user interface associated with the passenger type is configured to reduce a task completion time for the passenger type;

determining, by the processor and based on the image of the passenger, an estimated age of the passenger; and activating, based on the estimated age of the passenger being equal to or higher than a first critical age or being equal to or lower than a second critical age, a voice recognition device associated with the user interface such that the task completion time for controlling the user interface is shortened.

11. The method of claim 10, wherein the detecting the information associated with the passenger comprises:

receiving the image of the passenger captured by a camera, and wherein the determining the passenger type for the passenger comprises:

performing an artificial intelligence learning process associated with at least one of:

a preset body part; or a specific object connected to the preset body part; and determining, based on an output of the artificial intelligence learning process, a degree of freedom of a body part of the passenger.

12. The method of claim 11, further comprising:

activating, based on the degree of freedom of the body part of the passenger being equal to or lower than a critical degree of freedom, at least one of:

a motion recognition device associated with the user interface device; or the voice recognition device associated with the user interface device.

13. The method of claim 11, further comprising:

determining, based on the artificial intelligence learning process, the abnormality associated with the appearance of the passenger, and activating, based on a determination that the passenger has a visual impairment or an arm impairment, the voice recognition device associated with the user interface device.

14. The method of claim 10, further comprising:

activating, based on a determination that the passenger has a hearing impairment, at least one of:

a touch screen associated with the user interface device; or a motion recognition device associated with the user interface device.

15. The method of claim 13, wherein the determining the abnormality associated with the appearance of the passenger is further based on personal information of the passenger, and wherein the abnormality associated with the appearance of the passenger comprises an abnormality associated with at least one body part of the passenger.

16. The method of claim 10, further comprising:

displaying a display image on a display device at a position facing a face of the passenger, wherein the determining the passenger type for the passenger further comprises:

determining a behavior pattern of the passenger.

17. The method of claim 10, further comprising:

activating, based on a determination that the passenger is eating or drinking, a speaker, of an output interface, and the voice recognition device.

18. The method of claim 10, further comprising:

determining a sitting position of the passenger;

activating a display associated with the sitting position of the passenger; and activating, based on the sitting position of the passenger corresponding to a rear seat of the vehicle, at least one of:

a voice recognition device; or a motion recognition device.

19. The method of claim 10, wherein the determining of the estimated age of the passenger comprises:

transmitting, as input to an artificial intelligence learning model, a signal indicating the information associated with the passenger, wherein the information comprises a plurality of images of the passenger; and receiving, as output from the artificial intelligence learning model, output data indicating the estimated age of the passenger, wherein the artificial intelligence learning model is trained by the plurality of images of the passenger.

20. A device comprising:

a sensor configured to acquire information associated with a passenger of a vehicle;

a user interface device configured to receive at least one user input of the passenger; and a processor configured to:

monitor, based on the information associated with the passenger, the passenger;

determine, based on a type of an abnormality associated with an appearance of the passenger in a plurality of images captured by the sensor, a passenger type for the passenger;

provide, based on the passenger type for the passenger and via the user interface device, a user interface associated with the passenger type, wherein the user interface associated with the passenger type is configured to reduce a task completion time for the passenger type; and activate, based on an estimated age of the passenger being equal to or higher than a first critical age or being equal to or lower than a second critical age, a voice recognition device associated with the user interface such that the task completion time for controlling the user interface is shortened.

* * * * *